US005540396A

United States Patent [19]
Zanon

[11] Patent Number: 5,540,396
[45] Date of Patent: Jul. 30, 1996

[54] FISHING REEL WITH AUTOMATIC AND MANUAL BAIL ARM

[75] Inventor: Joseph Zanon, Marignier, France

[73] Assignee: Mitchell Sports, Societe Anonyme, Paris, France

[21] Appl. No.: 558,054

[22] Filed: Nov. 13, 1995

Related U.S. Application Data

[63] Continuation of Ser. No. 207,591, Mar. 8, 1994, abandoned.

[30] Foreign Application Priority Data

Mar. 9, 1993 [FR] France .................... 93 02913

[51] Int. Cl.$^6$ .................................... A01K 89/01
[52] U.S. Cl. .................................... 242/232
[58] Field of Search .................... 242/231, 232

[56] References Cited

U.S. PATENT DOCUMENTS 2,966,314  12/1960  Mombur .
4,502,645  3/1985  Sazaki et al. .
4,527,752  7/1985  Maruyama .
5,042,741  8/1991  Aota .

FOREIGN PATENT DOCUMENTS 2676887  12/1992  France .................... 242/232
3731553  4/1989  Germany .
2258595  2/1993  United Kingdom .

*Primary Examiner*—Joseph J. Hail, III
*Attorney, Agent, or Firm*—Foley & Lardner

[57] ABSTRACT

A fishing reel comprises, in a first bail arm, a locking device enabling locking of the bail arm in its closed position. It comprises in a second bail arm a return spring urging the bail arm from its closed position towards its open position and a mechanical transmission actuated by rotation of the bail arm drum to return the bail arm automatically from its open position towards its closed position. Unlocking of the bail arm in its closed position is effected manually, either by manual further pivoting in the closing direction or by manual partial pivoting in the opening direction. The bail arm can also be returned from its open position to its closed position manually.

13 Claims, 4 Drawing Sheets

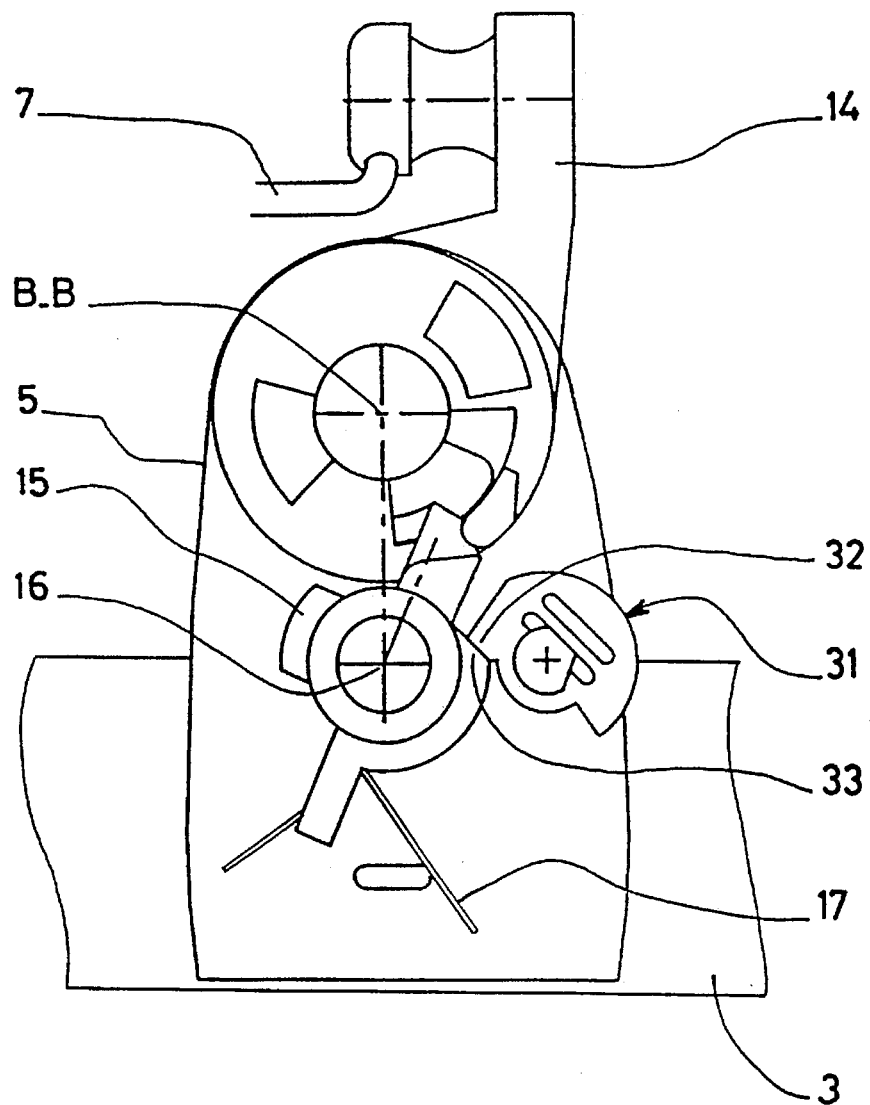
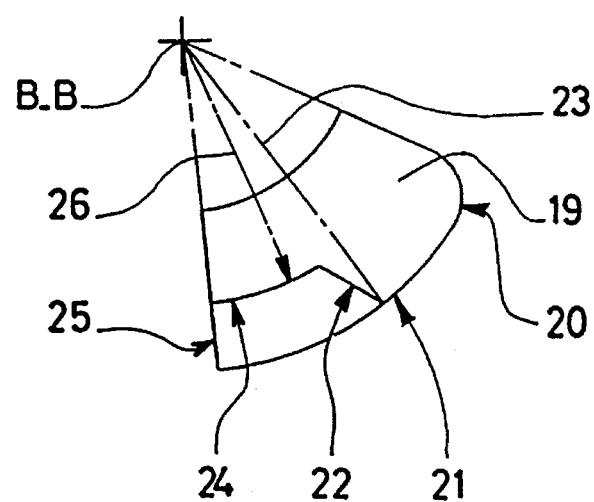

5,540,396

FISHING REEL WITH AUTOMATIC AND MANUAL BAIL ARM

This is a File Wrapper Continuation of application Ser. No. 08/207,591 filed Mar. 8, 1994 abandoned.

BACKGROUND OF THE INVENTION

1. Field of the Invention

The present invention concerns fishing reels for casting of the type with a fixed spool and a bail arm for winding on the fishing line.

2. Description of the Prior Art

Fixed spool fishing reels comprise a spool mounted on a longitudinal shaft carried by a reel body and acted on by brake means opposing its rotation relative to the reel body. A bail arm drum is mounted to rotate about the spool shaft and is urged to rotate by a bail arm drive mechanism. The bail arm drum carries opposite first and second bail arms offset laterally towards the outside of the spool and extending towards the front. A bail arm bow comprises a first end fixed to a first bow base pivoting on the first arm and a second end fixed to a second bow base pivoting on the second arm. The bail arm bow and its two bow bases can pivot about a common transverse axis between a closed position in which the bail arm guides the fishing line to wind it around the spool and an open position in which the bail arm releases the fishing line.

In a first prior art reel design the bail arm bow is acted on by a return spring urging it from its open position to its closed position. Before making a cast, the angler pushes the bail arm manually against the return spring until it clicks into the open position. After the cast the click-action device is operated to release the bail arm which returns to the closed position due to the action of the return spring.

The drawback of this first design of reel lies in the fact that the angler must operate the bail arm deliberately between its closed position and its open position, a relatively large movement.

In a second prior art reel design, as described for example in the documents U.S. Pat. No. 2,966,314, U.S. Pat. No. 4,502,645 and FR-A-2 676 887, a spring urges the bail arm from its closed position towards its open position, the bail arm being normally held in the closed position by a click-action device which is released by manual actuation of the bail arm with a further movement in the closing direction. The bail arm is returned automatically from its open position to its closed position by a mechanical transmission loaded by the rotation force of the bail arm drum during the operation of recovering the line onto the spool.

The benefit of this second bail arm design is that, to return the bail arm from the closed position to the open position, before making a cast, the movement to be deliberately imparted by the angler to the bail arm is small, being that just necessary to unlock the click-action means. Also, the return movement of the bail arm from its open position to its closed position is effected automatically at the end of a cast, when the angler operates the fishing line recovery crank.

However, in this second prior art reel design when the bail arm is in the closed position unlocking can only be effected by manual actuation of the bail arm to move it further in the closing direction. This is an unnatural movement as it is in the opposite direction to the rotation required of the bail arm when it pivots from the closed position to the open position. Many anglers are used to employing a reel with the first prior art design in which the angler pushes the bail arm manually against a return spring from the closed position until it clicks in the open position. If the angler attempts to push the bail arm from its closed position to its open position in the second prior art design of reel, the locking means oppose such movement. This entails a risk of damaging the reel, either by deformation on the bail arm itself or by breakage of some parts of the mechanism.

SUMMARY OF THE INVENTION

The problem to which the present invention is addressed is thus that of designing a new type of reel in which a spring urges the bail arm from its closed position towards its open position and locking means retain the bail arm in the closed position, transmission means returning the bail arm from its open position to its closed position during a line recovery stage, in which design there is no risk of breakage or deformation of components of the reel if the angler attempts to return the bail arm manually from its closed position towards its open position.

To achieve these and other objects, a fishing reel with fixed spool and bail arm in accordance with the present invention utilizes the same main component parts as prior art reels, i.e. a spool mounted on a longitudinal shaft carried by a reel body, a bail arm drum mounted to rotate about the spool shaft and acted on by a bail arm drive mechanism, and a bail arm bow mounted to pivot on the bail arm drum about a common bail arm rotation axis between a closed position and an open position.

As in reels with the second prior art design mentioned above, the bail arm in accordance with the invention is urged to rotate in the opening direction by return spring means urging it towards the open position; the bail arm is urged to rotate in the closing direction by a mechanical transmission adapted to return it to the closed position by rotation of the bail arm drum driven by the drive mechanism; the articulation of the bail arm allows manual actuation of the bail arm to move it from the open position to the closed position; a locking mechanism retains the bail arm in the closed position, this locking mechanism being such that unlocking can be effected by manual actuation of the bail arm to pivot it further in the closing direction, followed by releasing it to allow the return spring means to act.

According to the present invention the locking mechanism is such that unlocking can also be effected by forced manual actuation of the bail arm in the opening direction over part of its travel after which the return spring means cause the bail arm to move to the fully open position.

According to one embodiment of the invention:

the locking mechanism comprises a locking lever mounted on a first lateral bail arm to pivot about an axis parallel to and offset with respect to the common axis of said bail arm, this lever being adapted to pivot in either direction away from an intermediate inoperative position and being urged by return spring means towards said inoperative position, the locking lever including a locking pin which extends substantially in the direction of the common axis when said lever is in the inoperative position;

the locking mechanism further comprises a locking cam mounted on the bail arm and comprising inclines adapted to cooperate with the end of the locking pin so that:

upon rotation of the bail arm from its closed position into its open position the locking cam pushes back the locking pin which pivots in order to allow this rotation;

in the closed position of the bail arm the locking pin and the locking cam are in pivoted positions and the locking pin locates in axial bearing engagement in a notch in the locking cam, preventing return movement of the locking cam and of the bail arm to their open position;

by means of further rotation of the bail arm towards its closed position, the locking pin escapes from the cam which can then push it back towards the closed position;

according to the invention, the locking cam is mounted on guides of the bail arm to slide along an appropriate path between a locked extreme position towards which it is urged by a cam spring and a retracted position opposite the locking lever; the cam spring is stiffer than the bail arm return spring means; an unlocking lug is provided on the bail arm and adapted to bear against an unlocking incline on the locking lever and to force pivoting of the locking lever away from the locking cam on retraction of the cam.

Thus manual actuation of the bail arm in the opening direction causes retraction of the locking cam on its guides against its cam spring and causes displacement of the unlocking lug in bearing engagement against the unlocking incline, so forcing pivoting of the locking lever which then releases the locking cam and enables rotation of the bail arm towards its open position due to the action of its return spring means.

The mechanical transmission is preferably of a type which exerts upon the bail arm a unidirectional couple in the direction from the open position towards the closed position, to the exclusion of any return couple in the opposite direction, so that when the bail arm is in the open position the angler can freely actuate the bail arm manually to pivot it into its closed position, without the transmission offering any resistance.

BRIEF DESCRIPTION OF THE DRAWINGS

Other objects, features and advantages of the present invention will become apparent from the following description of specific embodiments given with reference to the appended figures.

FIG. 10 shows the locking device retained in the locked position by blocking means.

FIG. 15 shows, to a larger scale, the profile of a locking cam which is part of the locking mechanism shown in FIGS. 2 to 14.

DETAILED DESCRIPTION OF THE PREFERRED EMBODIMENT

Figure 1:
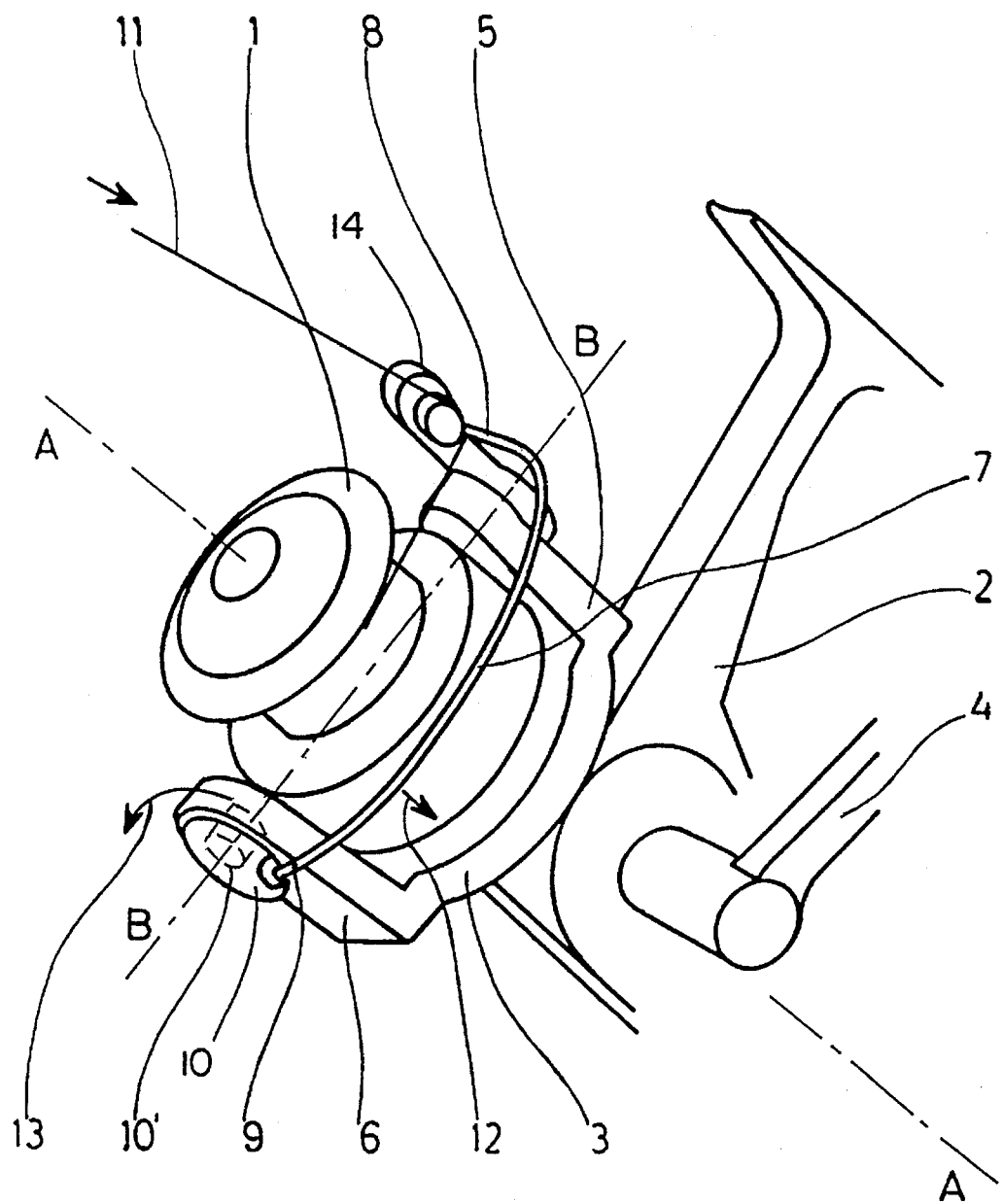
FIG. 1 is a perspective diagrammatic view of a reel according to the present invention, the bail arm being in the closed position.

As shown in perspective in FIG. 1, a fishing reel according to the invention comprises a "fixed" spool 1 mounted on a longitudinal shaft along a longitudinal axis A—A, said shaft being carried by a reel body 2 and acted on by braking means (not shown) opposing its rotation relative to the reel body.

A bail arm drum 3 is mounted to rotate about the spool shaft, on the longitudinal axis A—A, and is urged into rotation by a bail am drive mechanism, for example a mechanism which can be urged into rotation by the angler by means of a crank 4.

The bail arm drum 3 carries a first recovery arm 5 and a second recovery arm 6, the first arm 5 and the second arm 6 being diametrally opposed, and offset laterally towards the exterior of the spool 1 and extending towards the front of the reel, as the figure shows.

A recovery bow 7 comprises, in a known way, a first end 8 fixed to a first bow base (not shown in this figure) housed in the first arm 5 and pivoting on this first arm and a second end 9 fixed to a second bow base 10 pivoting on the second arm 6. The recovery bow 7 and its two bases, including the second base 10, can pivot about a common transverse axis B—B between a closed position shown in FIG. 1 in which the bail arm guides the fishing line 11 in order to wind it onto the line store of the spool 1 and an open position in which the bail arm is retracted laterally in order to free the fishing line 11.

In the embodiment shown in these figures the second bow base 10 is urged into rotation about the common axis B—B by return spring means 10' (shown in phantom) tending to return it to the open position while the first bow base, disposed on the first recovery arm 5, is urged into rotation in the closing direction by mechanical transmission means bringing it into the closed position during rotation of the bail arm drum 3 driven by the drive mechanism and the crank 4. A locking mechanism (not visible in FIG. 1) contained in the first recovery arm 5 retains the bail arm in the closed position. Unlocking is obtained by manual actuation of the bail arm to cause further pivoting movement in the closing direction, as shown by the arrow 12, followed by its release in order to allow the return spring means 10' to act, returning the bail arm towards its open position by a pivoting movement about the common axis B—B in the direction shown by arrow 13.

As FIGS. 2 to 10 show, the locking mechanism allowing retention of the bail arm in the closed position is contained in an internal housing provided in the first recovery arm 5, integral with the bail arm drum 3. In these figures there can be seen the first bow base of the bail arm 14 which pivots on the first arm 5 about the common transverse axis B—B.

The locking mechanism comprises a locking lever 15 mounted to pivot on the first recovery arm 5 about a transverse axis 16 parallel to and offset from the common axis B—B. The locking lever 15 can pivot in either direction away from an intermediate inoperative position shown in FIG. 4 or FIG. 6 and is driven by resilient means 17 which return it towards the inoperative position.

The locking lever 15 comprises a locking pin 18 which extends substantially in the direction of the common axis B—B when the locking lever 15 is in the inoperative position. In other words, in the inoperative position shown in FIGS. 4 and 6 the locking pin 18 is in the plane formed by the common transverse axis B—B and the transverse rotation axis 16 of the locking lever 15.

The locking mechanism further comprises a locking cam 19 carried by the first bow base 14 and comprising inclined surfaces adapted to cooperate with the end of the locking pin 18. The locking cam 19 is shown to a larger scale in FIG. 15. The locking cam 19 comprises a terminal first incline 20, preferably rounded as the figure shows, with a generally radial orientation connecting with a return second incline 21. The return second incline 21 has a maximum radius 23 relative to the common rotation axis B—B, i.e. it is constituted by the cam surface 19 formed by the points farthest from the axis B—B. The return second incline 21 connects with a blocking third incline 22. The blocking incline 22 is oblique, canted slightly outwards relative to the limiting radius 23. This oblique blocking incline is generally planar, for example. It connects with a maintaining fourth incline 24 with a radius 26 less than the radius 23 of the second incline 21. The fourth incline 24 connects with an escapement fifth incline 25 which is generally radial.

Figure 2:
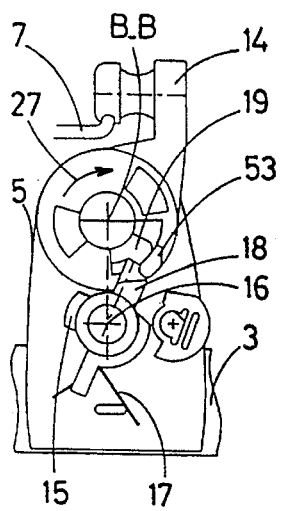
FIG. 2 is a side view in partial section, showing a construction of the locking mechanism for keeping the bail arm in the closed or line-recovery position.
Figure 7:
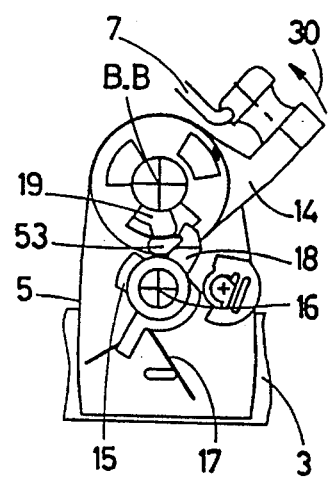
FIG. 7 shows the movement of the locking mechanism when the bail arm executes the return movement from its open towards its closed position.
Figure 8:
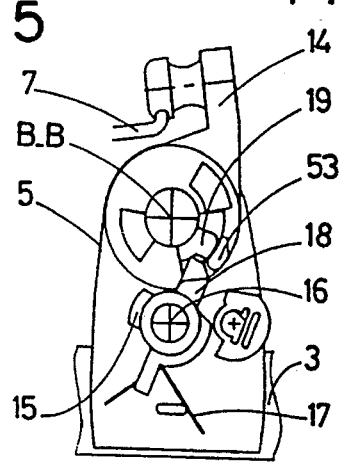
FIG. 8 shows the condition of the locking mechanism when the bail arm has passed its closed position, in order to produce locking.
Figure 9:
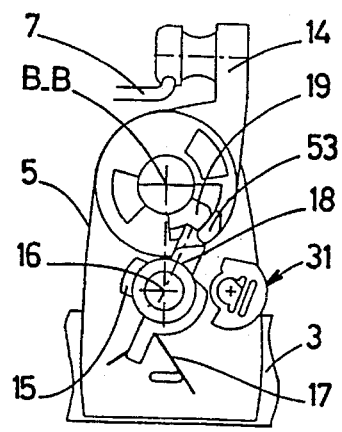
FIG. 9 shows the condition of the locking mechanism when the bail arm has returned to the closed position.

As FIGS. 2 to 9 show, the locking lever 15 cooperates with the locking cam 19 in order to cause locking when the bail arm is in its closed position as shown in FIGS. 2 and 9. For this purpose, the distance between the common transverse axis B—B and the transverse rotation axis 16 of the locking lever 15 is slightly greater than the length of the locking pin 18 plus the radius 26 of the maintaining fourth incline 24. Thus in the closed position of the bail arm the locking pin 18 is pivoted in a first direction away from its inoperative position (for example to the right in FIGS. 2 and 9), the locking cam 19 being likewise pivoted to the right in a corresponding position, the oblique blocking third incline 22 being in axial contact against the end of the locking pin 18. In this position the locking pin 18 forms a stop; preventing displacement of the locking cam 19 in the direction of rotation shown by the arrow 27, i.e. it prevents pivoting of the first base 14 and the recovery bow 7 towards the open position.

Figure 3:
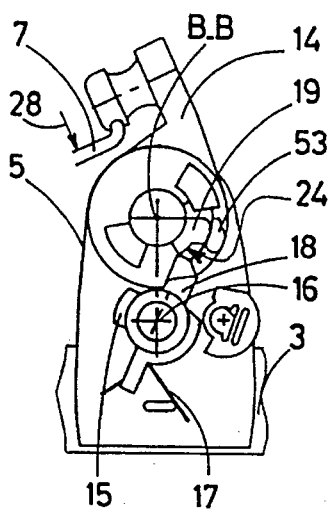
FIG. 3 is the same view of the reel, showing the condition of the locking mechanism during the normal unlocking operation, just before unlocking.
Figure 4:
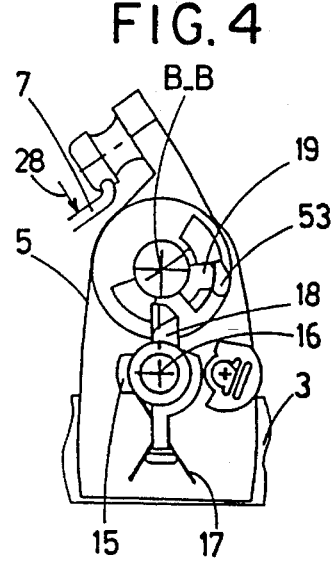
FIG. 4 shows the instant at which normal unlocking of the bail arm locking mechanism occurs.
Figure 5:
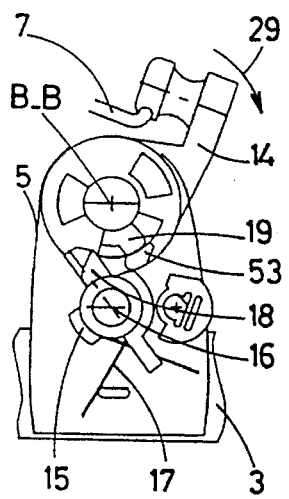
FIG. 5 shows the return movement of the bail arm from its closed towards its open position.

The necessary movement of the bail arm in order to bring about normal unlocking is shown in FIGS. 3 and 4. In FIG. 3, the angler has begun to pivot the bail arm anticlockwise, as shown by the arrow 28 and during the corresponding pivoting movement of the locking cam 19 the end of the locking pin 18 slides on the fourth incline 24 without opposing this pivoting movement. In FIG. 4 further anticlockwise pivoting of the bail arm as shown by the arrow 28 has passed the position in which the recovery pin 18 has reached the end of the fourth incline 24 and escaped from the locking cam 19, returning to the inoperative position due to the action of the resilient means 17. In FIG. 5, the angler releases the bail arm which then moves clockwise, as shown by the arrow 29, towards its open position due to the action of return spring means (not shown in the figures) to be described later; in its rotation about the common axis B—B the locking cam 19 pushes back the locking pin 18, causing the locking lever 15 to pivot about its axis 16 in an anticlockwise direction. The locking pin 18 slides on the inclines of the locking cam 19, without offering any substantial resistance to the pivoting movement of the bail arm.

Figure 6:
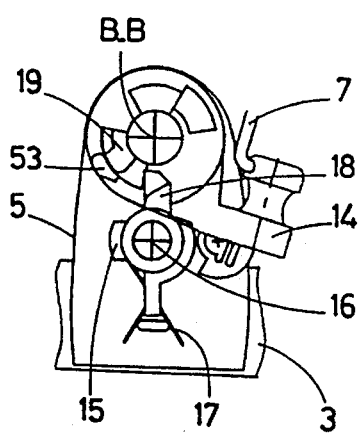
FIG. 6 shows the condition of the locking mechanism when the bail arm is in the open position.

In FIG. 6 the bail arm (of which the first base 14 and the bow 7 are shown) has reached its open position and, after sliding on the locking cam 19, the locking pin 18 has returned to the inoperative position.

FIGS. 7 to 9 show the return of the bail arm from its inoperative position towards its closed position by rotation caused by mechanical transmission means (not shown in FIGS. 7 to 9 but is advantageously of the type described in the document FR-A-2 676 887). In FIG. 7 during a first stage of anticlockwise rotation of the bail arm, as shown by arrow 30, the locking cam comes to bear with its terminal first incline 20 on the side of the locking pin 18, causing rotation of the locking lever 15 in a clockwise direction. The end of the locking pin 18 then slides on the return second incline 21 with the maximum radius, until it reaches the end of this second incline. The pin then slides onto the oblique blocking third incline 22 and abuts against the maintaining fourth incline 24 of smaller radius, locating in the notch formed by the third incline 22 and the fourth incline 24. Rotation of the bail arm can continue over a limited angle, according to which the end of the locking pin 18 must remain in contact with the fourth incline 24 without reaching its end. The mechanical transmission means must then release the bail arm which, due to the action of its return spring means, returns to the inoperative position shown in FIG. 9, the end of the locking pin 18 coming to bear against the third incline 22 of the locking cam 19, preventing any rotation of the bail arm in a clockwise direction. Thus during return of the bail arm from its open towards its closed position the mechanical transmission ensures rotation of the bail arm as far as a point slightly beyond the closed position to allow the locking pin 18 to pass from the return second incline 21 to the maintaining fourth incline 24 without passing beyond the maintaining fourth incline 24, however.

The unlocking movement shown in FIGS. 2 to 4 is made possible by the fact that after reaching the end of the fourth incline 24 the locking lever 15 pivots and returns to its inoperative position due to the action of its resilient means 17. In order to prevent unlocking and to prevent the bail arm from returning to its open position as a result of an involuntary movement it is sufficient to prevent pivoting of the locking lever 15 and to retain it in its pivoting position as shown in FIGS. 2 and 3, as in the locking position. For this purpose, a blocking member 31, shown for example in FIGS. 9 and 10, allows the locking lever 15 to be selectively retained in its pivoted locking position, preventing unlocking during further pivoting of the bail arm.

In the embodiment shown, the blocking member 31 is a rotary button which is actuated by the angler and comprises a blocking facet 32 which, in the blocking position shown in FIG. 10, bears against a corresponding facet 33 of the locking lever 15 to prevent rotation of the locking lever 15 in an anticlockwise direction towards its inoperative position. The blocking member 31 must for this purpose oppose only the return force of the resilient means 17 tending to pivot the locking lever 15 back towards its inoperative position. In order to oppose the force of the return means 17 the rotary button forming the blocking member 31 is braked in its rotation by appropriate means.

FIGS. 11 to 14 show the structure and functioning of the safety unlocking means specific to the invention.

The locking cam 19 slides on bail arm guides. These guides comprise an annular groove 50, preferably having a circular profile centered on the common rotation axis B—B of the bail arm. The annular groove 50 is formed on the first bow base 14. The annular groove 50 confers on the locking cam 19 a circular sliding movement against a cam spring 51 housed in said annular groove.

Figure 11:
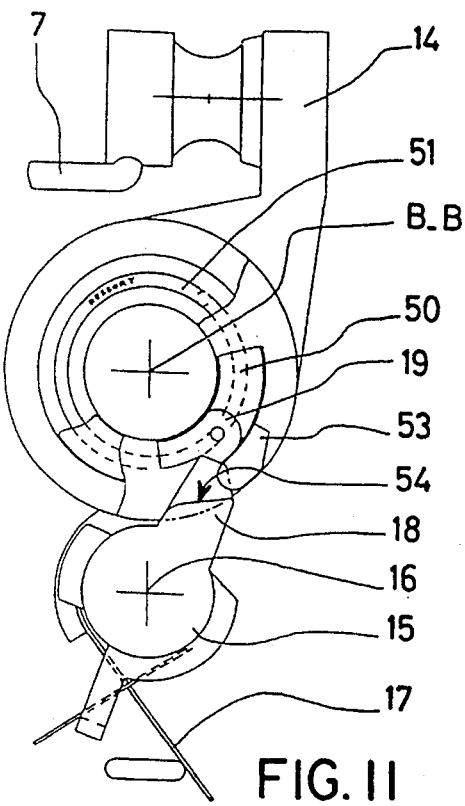
FIG. 11 is another side view in partial section of the structure of the locking mechanism according to the invention, showing the means for displacing the locking cam on the bail arm when the bail arm is in the locked closed position.

As it slides on the bail arm guides the locking cam 19 moves along an appropriate path between a locking extreme position, shown in FIG. 11, towards which it is urged by the cam spring 51, and a retracted position opposite the locking lever 15, shown in FIG. 2: the gap 52 shows the displacement of the locking cam 19.

The cam spring 51 is stiffer than the return spring means of the bail arm so that in the locked position shown in FIG. 11 the cam spring 51 holds the cam 19 in abutting engagement at the end of its travel on the bail arm guides 50, despite the rotation force applied by the bail arm return spring means urging it to rotate towards its open position.

Figure 12:
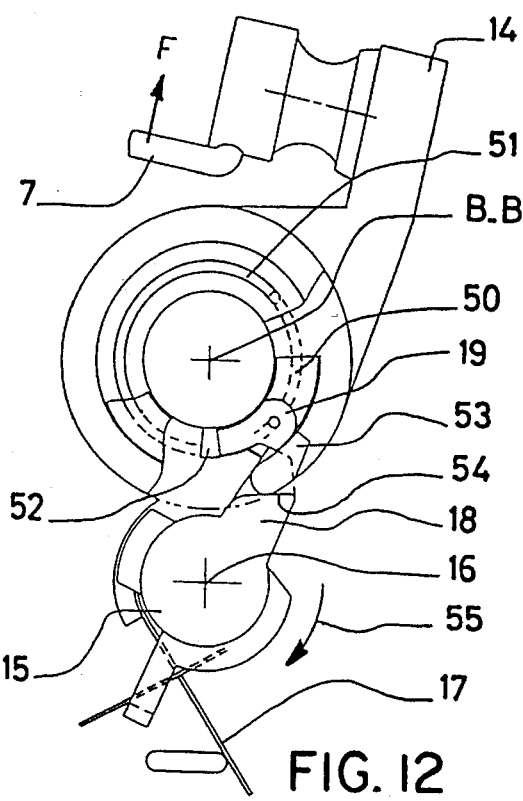
FIG. 12 is a side view of the same locking structure during manual displacement of the bail arm towards its open position.
Figure 13:
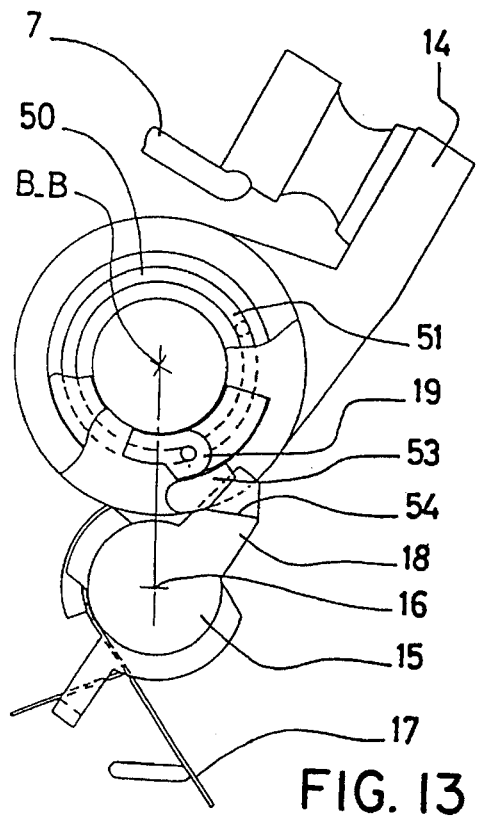
FIG. 13 shows the condition of the locking structure at the moment of safety opening.
Figure 14:
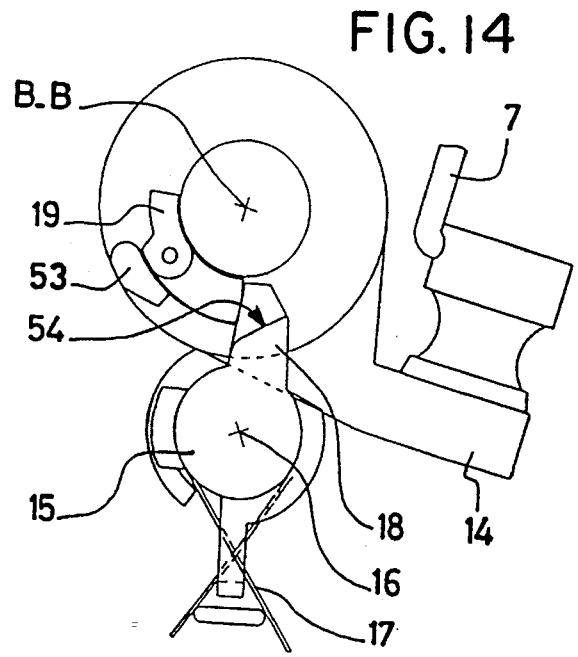
FIG. 14 shows the condition of the locking structure when the bail arm is in the open position.

The first bow base 14 further comprises an unlocking lug 53 located so as to bear against an oblique unlocking incline 54 on the locking lever 15 when the latter is in the locked position and when the locking cam 19 retracts as shown in FIG. 12. By action of the unlocking lug 53 against the unlocking incline 54, the unlocking lug forces the locking lever 15 to pivot away from the locking cam, as shown by the arrow 55, on manual actuation of the bail arm 7 in the opening direction as shown by the arrow F in FIG. 12.

Thus manual actuation of the bail arm in the opening direction as shown by the arrow F causes retraction of the locking cam 19 on its guides 50 against its spring 51 and displacement of the unlocking lug 53 in bearing engagement against the unlocking incline 54, so forcing the locking lever 15 to pivot in the direction of the arrow 55 until the locking lever 15 releases the locking cam 19 and enables rotation of the bail arm 7 towards its open position due to the action of its return spring means.

Thus the bail arm 7 of the reel in accordance with the present invention can be actuated in any of the following manners:

rotation of the crank 4 automatically closes the bail arm if the latter is initially in the open position, the angler can close the bail arm manually by pushing it from its open position to its closed position in which it is retained by locking means, normal unlocking in the closed position can be obtained by manual pushing of the bail arm further in the closing direction beyond the closed position, safety unlocking of the bail arm can also be achieved by manually pushing the bail arm partway towards its open position, after which opening is automatically effected by action of the return spring means of the bail arm.

The present invention is not limited to the embodiments explicitly described but includes various variants and generalizations thereof within the scope of the following claims.

There is claimed:

1. A fishing reel, comprising:

a reel body;

a spool mounted on a longitudinal spool shaft carried by the reel body;

a drum rotatably mounted about the spool shaft;

a bail arm pivotally mounted to the drum, the bail arm pivotable between a closed position in which the bail arm guides a fishing line around the spool and an open position in which the bail arm releases the fishing line, including a means for biasing the bail arm toward the open position; and a bail arm locking means for maintaining the bail arm in the closed position and selectively permitting pivotal movement of the bail arm to the open position by 1) manual movement of the bail arm toward the closed position followed by release of the bail arm or by 2) manual movement of the bail arm toward the open position.

2. The fishing reel according to claim 1, wherein the bail arm locking means includes:

a locking cam mounted to the bail arm;

a locking pin pivotally mounted to the drum, the locking pin having an operative position in which the locking pin engages the locking cam to maintain the bail arm in the closed position; and an unlocking lug on the bail arm, the unlocking lug bearing against the locking pin when in the operative position to move the locking pin out of engagement with the locking cam upon manual movement of the bail arm toward the open position.

3. The fishing reel according to claim 2, wherein the locking cam has a notch for receiving a forward end of locking pin, and the locking pin has an unlocking surface for bearing engagement with the unlocking lug.

4. The fishing reel according to claim 3, wherein the unlocking surface is remote from the forward end of the locking pin.

5. The fishing reel according to claim 2, wherein the locking cam is slidably mounted to the bail arm.

6. The fishing reel according to claim 5, wherein movement of the locking cam with respect to the bail arm is guided by guides, the guides comprising an annular groove in the bail arm and a cam spring housed within the annular groove, the cam spring biasing the locking cam toward the locking pin.

7. The fishing reel according to claim 6, wherein the means for biasing the bail arm toward the open position includes a return spring, and wherein the cam spring is stiffer than the return spring.

8. The fishing reel according to claim 6, wherein the annular groove has a circular profile centered on a rotation axis of the bail arm.

9. An improved locking device for a fishing reel including a reel body, a spool mounted on a longitudinal spool shaft carried by the reel body, a drum rotatably mounted about the spool shaft, the drum having a forward extending recovery arm, a bail arm pivotally mounted to the recovery arm, the bail arm pivotable between a closed position in which the bail arm guides a fishing line around the spool and an open position in which the bail arm releases the fishing line, means for urging the bail arm towards the open position, wherein the improvement comprises:

a locking cam slidably mounted to the bail arm, a means for urging the locking cam towards an extreme forward position;

a locking pin pivotally mounted to the recovery arm, the locking pin having an operative position in which the locking pin engages the locking cam to maintain the bail arm in the closed position; and an unlocking lug on the bail arm, the unlocking lug bearing against the locking pin when in the operative position to move the locking pin out of engagement with the locking cam upon manual actuation of the bail arm toward the open position.

10. The fishing reel according to claim 9, wherein the locking cam has a notch for receiving a forward end of locking pin, and the locking pin has an unlocking surface for engagement with the unlocking lug.

11. The locking device according to claim 9, wherein the means for biasing the bail arm includes a return spring and the means for urging the locking cam includes a cam spring, the cam spring being stiffer than the return spring.

12. The locking device according to claim 11, wherein the locking cam is slidable along an annular groove in the bail arm, and wherein a return spring is located within the annular groove for urging the locking cam.

13. The locking device according to claim 12, wherein the annular groove has a circular profile which is coaxial with a rotation axis of the bail arm.

* * * * *